(12) United States Patent
VanDuyn et al.

(10) Patent No.: US 8,132,205 B2
(45) Date of Patent: Mar. 6, 2012

(54) ELECTRONIC PROGRAM GUIDES, SYSTEMS AND METHODS PROVIDING DATE ACCESS TO PROGRAM INFORMATION

(75) Inventors: Luke VanDuyn, Highlands Ranch, CO (US); Daniel Rudolph, Castle Rock, CO (US); Matthew Coburn, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 452 days.

(21) Appl. No.: 12/370,464

(22) Filed: Feb. 12, 2009

(65) Prior Publication Data

US 2010/0205637 A1    Aug. 12, 2010

(51) Int. Cl.
*G06F 3/00* (2006.01)
*G06F 13/00* (2006.01)
*H04N 5/445* (2006.01)

(52) U.S. Cl. ............... 725/44; 725/39; 725/40; 725/50; 725/52

(58) Field of Classification Search ................ None
See application file for complete search history.

(56) References Cited

U.S. PATENT DOCUMENTS

| 2001/0013126 A1* | 8/2001 | Lemmons et al. | 725/53 |
| 2001/0013127 A1* | 8/2001 | Tomita et al. | 725/58 |
| 2001/0016945 A1* | 8/2001 | Inoue | 725/44 |

* cited by examiner

Primary Examiner — Mark D Featherstone
(74) Attorney, Agent, or Firm — Dorsey & Whitney LLP (57) ABSTRACT

An enhanced electronic program guide (EPG) for television programming may allow access to program information based on a specified date. In embodiments, the EPG may be output for display with timeslots containing program information corresponding to television programs being broadcast currently and to television programs scheduled for future broadcast, and a header indicating a plurality of dates for accessing corresponding program information. User input received while the EPG is being output for display with the header indicating a plurality of dates that identifies one of the plurality of dates may cause program information in the EPG corresponding to the identified date to be accessed and the EPG to be output for display with the program information corresponding to the identified date and with a header indicating times of the timeslots. In embodiments, the header indicating times of the timeslots may replace the header indicating a plurality of dates.

16 Claims, 5 Drawing Sheets

FIG.1

| PROGRAM GUIDE | | | | 9:52AM FRI 2/29 | ? AA ▽ △ |
|---|---|---|---|---|---|
| ALL CHAN | ALL SUB | HD | MY SPORTS | | |
| IRON MAN (ALL DAY) PG-13 MOVIE 64 ROBERT DOWNEY JR., TERRENCE HOWARD, GWENETH PALTROW. (2008) A WEALTHY INDUSTRIALIST BUILDS AN ARMORED SUIT AND USES IT TO DEFEAT CRIMINALS AND TERRORISTS. BASED ON THE COMIC BOOK CHARACTER. | | | | | |
| 2/29 | 9:00 | 9:30 | 10:00 | 10:30 ⤺56 11:00 | 11:30 ⬅66 |
| 5500 BRAVO | i INSIDE THE DEMON | JOE SIXPACK | PROBLEM CHILD | MY OWN WORST ENEMY | CHARMED |
| 5501 TOON | MEET THE ROBINSONS | | | | FRIENDS |
| 5502 FX | ART SCHOOL CONFIDENTIAL | | MOTORSPORTS HOUR | | MY OWN WORST ENEMY |
| 5503 EACTN | SPORTS CENTER | | MOTORSPORTS HOUR | | JOE THE PLUMBER |
| 5504 TNT | SHADOWS AND FOG | | THE OFFICE | THE TV SET | PROBLEM CHILD |

ELECTRONIC PROGRAM GUIDES, SYSTEMS AND METHODS PROVIDING DATE ACCESS TO PROGRAM INFORMATION

TECHNICAL FIELD

The inventive field relates generally to electronic program guides (EPGs) used by a client device, such as a set top box (STB), digital video recorder (DVR) or similar device. The inventive field also relates to providing an enhanced electronic program guide for such devices, and devices providing an enhanced electronic program guide.

BACKGROUND DISCUSSION

The proliferation of subscription television programming, the increasing number of available channels, and the corresponding increase in television programming have led to continued development of onscreen program directories and guides. Such onscreen programming solutions, collectively referred to herein as electronic program guides, have ranged from program information for each channel scrolling vertically across the screen to user controllable interfaces that allow users to examine scheduling information describing television programs currently on-air and to be broadcast in the future.

In direct broadcast satellite (DBS) systems, EPG information is periodically downloaded and updated, usually at regular intervals. Prior art approaches have allowed users to examine scheduling information that has been downloaded to the client device, either by scrolling sequentially through listings corresponding to one-half hour or hour increments or by directly accessing individual timeslots. Further, some EPGs may allow a user to directly access desired programs or even set programs to be recorded automatically.

Known EPGs provide access to program information in various ways. EPGs generally provide program information, such as the channel, the time slot and duration, and the title of the program. Other information about the program, such as a brief description of the content and/or the names of the actors, may also be presented. Known EPGs also provide limited user interactivity, such as moving between time slots to view program information and setting current or future programs for recording.

SUMMARY

Conventional EPGs may not provide an ability to access program information based on dates, that is, calendar days. For example, for a user to access program information for timeslots of a particular day of interest in conventional EPGs, the user may be required to navigate sequentially through intervening timeslots for days in the EPG between the currently displayed timeslots and the timeslots for the day of interest. Although some EPGs include a functionality of jumping in fixed increments, such as twelve hours, to speed the sequential navigation, such navigation may still require an extended series of user inputs to reach the day of interest. Embodiments described herein contemplate accessing program information in an EPG based on dates, particularly in a manner that is convenient, easy and/or intuitive to a user of the EPG.

Various embodiments relate to systems and methods for enhancing an EPG. Enhancements may relate to providing a user with date-based control of program information that is displayed in the EPG. In particular, enhancements may relate to providing non-sequential access to program information in the EPG in response to user input.

Some embodiments may comprise a method of accessing program information in an EPG. The method may include: storing an electronic program guide on a client device, the electronic program guide divided into timeslots containing program information corresponding to television programs being broadcast currently and to television programs scheduled for future broadcast; receiving a first user input at the client device; outputting, in response to the first user input, the electronic program guide from the client device to be displayed with a header indicating a plurality of dates for accessing corresponding program information; receiving a second user input at the client device while the electronic program guide is being output for display with the header indicating a plurality of dates, the second user input identifying one of the plurality of dates; accessing program information in the electronic program guide corresponding to the identified one of the plurality of dates; and outputting the electronic program guide from the client device to be displayed with the program information corresponding to the identified one of the plurality of dates and with a header indicating times of the timeslots.

In some embodiments, outputting the electronic program guide from the client device to be displayed with the header indicating times of the timeslots may include replacing the header indicating a plurality of dates with the header indicating times of the timeslots.

In some embodiments, the method may include receiving a third user input at the client device while the electronic program guide is being output to be displayed with the header indicating times of the timeslots. In response to the third user input; the electronic program guide may be output from the client device to be displayed with the header indicating a plurality of dates. In such embodiments, outputting the electronic program guide in response to the third user input may include replacing the header indicating times of the timeslots with the header indicating a plurality of dates.

In some embodiments, the electronic program guide to be displayed includes an area in addition to the timeslots and the header. In such embodiments, outputting the electronic program guide from the client device to be displayed with the header indicating a plurality of dates may include outputting the electronic program guide from the client device to be displayed with instructional information for accessing corresponding program information via the plurality of dates in the area. Further, outputting the electronic program guide from the client device to be displayed with the header indicating times of the timeslots may include outputting the electronic program guide from the client device to be displayed with information corresponding to a program of one of the timeslots in the area.

Some embodiments may comprise a television receiving device. The device may include: a memory configured to store an electronic program guide, the electronic program guide divided into timeslots containing program information corresponding to television programs being broadcast currently and to television programs scheduled for future broadcast; a user interface configured to receive user input; and a processor in communication with the memory and the user interface. The processor may be configured to output the electronic program guide to be displayed with a header indicating a plurality of dates for accessing corresponding program information in response to a first user input received via the user interface, may be configured to access program information in the electronic program guide corresponding to one of the plurality of dates identified by a second user input received via the user interface, and may be configured to output the electronic program guide to be displayed with the program information corresponding to the identified one of the plurality of dates and with a header indicating times of the timeslots.

In some embodiments, the processor may be configured to output the electronic program guide to be displayed with the header indicating times of the timeslots replacing the header indicating a plurality of dates in response to the second user input.

In some embodiments, the processor may be configured to output the electronic program guide to be displayed with the header indicating a plurality of dates in response to a third user input received via the user interface while the electronic program guide is being output to be displayed with the header indicating times of the timeslots. In such embodiments, the processor may be configured to output the electronic program guide to be displayed with the header indicating a plurality of dates replacing the header indicating times of the timeslots in response to the third user input.

In some embodiments, the processor may be configured to output the electronic program guide to be displayed with an area in addition to the timeslots and the header. In such embodiments, the area may include information corresponding to a program of one of the timeslots when the processor outputs the electronic program guide with the header indicating times of the timeslots. Further, when the processor outputs the electronic program guide with the header indicating a plurality of dates, the area may include instructional information for accessing corresponding program information via the plurality of dates.

Some embodiments may provide an enhanced EPG in the form of a graphical user interface for a television receiving device. The graphical user interface may include: an electronic program guide divided into at least a two-dimensional grid of timeslots containing program information corresponding to television programs being broadcast currently and to television programs scheduled for future broadcast; and at least one user selectable icon indicating a plurality of dates. The at least one user selectable icon may be configured to cause the television receiving device to access corresponding program information in response to user input selecting one of the plurality of dates.

In some embodiments, the at least one user selectable icon may comprise a header of the at least two-dimensional grid of timeslots. In such embodiments, the graphical user interface may include a header indicating times of the timeslots that replaces the at least one user selectable icon in response to the user input selecting one of the plurality of dates.

In some embodiments, the graphical user interface may include an area in addition to the at least two dimensional grid of timeslots and the header. In such embodiments, the area may include instructional information for accessing corresponding program information via the plurality of dates.

In some embodiments, the graphical user interface may further include a header indicating times of the timeslots that replaces the at least one user selectable icon in response to the user input selecting one of the plurality of dates. In such embodiments, the area in addition to the at least two dimensional grid of timeslots and the header may include information corresponding to a program of one of the timeslots when the header indicating times of the timeslots replaces the at least one user selectable icon. In such embodiments, the information corresponding to a program of one of the timeslots may replace the instructional information when the header indicating times of the timeslots replaces the at least one user selectable icon.

Some embodiments may provide an enhanced EPG in the form of a computer-readable storage medium. The computer-readable storage medium may include instructions stored thereon that, when executed by a processor, cause the processor to provide an electronic program guide for display on a viewing screen by: accessing an electronic program guide, the electronic program guide divided into timeslots containing program information corresponding to television programs being broadcast currently and to television programs scheduled for future broadcast; outputting, in response to a first user input, the electronic program guide to be displayed with a header indicating a plurality of dates for accessing corresponding program information; accessing program information in the electronic program guide corresponding to one of the plurality of dates identified by a second user input; and outputting, in response to the second user input the electronic program guide to be displayed with the program information corresponding to the identified one of the plurality of dates and with a header indicating times of the timeslots.

In some embodiments, outputting the electronic program guide to be displayed with the header indicating times of the timeslots may include replacing the header indicating a plurality of dates with the header indicating times of the timeslots.

In some embodiments, the computer-readable storage medium may include instructions stored thereon that, when executed by a processor, cause the processor to provide an electronic program guide for display on a viewing screen by outputting, in response to a third user input, the electronic program guide to be displayed with the header indicating a plurality of dates. In such embodiments, outputting, in response to the third user input, the electronic program guide to be displayed with the header indicating a plurality of dates may include replacing the header indicating times of the timeslots with the header indicating a plurality of dates.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

As used herein, the terms "electronic programming guide" or "EPG" are intended to encompass an interface provided to a user and an underlying television broadcast system or component that supports functionality with the programming content. The enhanced EPG described herein may be considered to be embodied in the interface, a display, such as a televisions or monitor, software and/or hardware, either alone or in combination. As such, the term EPG is used in a broad sense for the sake of clarity in the description, without being limiting.

The embodiments shown in the Figures illustrate graphical user interfaces, methods and systems that may provide an enhanced EPG. Enhancements may relate to providing an EPG that allows programming information to be accessed based on date. In particular, enhancements may relate to providing an EPG in which access to programming information is non-sequential. For example, the EPG may present a plurality of dates that may be selected by a user to cause programming information corresponding to the user-selected date to be accessed and output for display in the EPG.

As described herein, displaying a plurality of user-selectable dates may allow a user to access programming information in the EPG in a non-sequential manner. In other words, the user need not sequentially move through programming information to go from programming information currently displayed to programming information for a particular date of interest to the user. Thus, a user may be provided with control that allows the user to skip directly to programming information for the particular date of interest.

In general, embodiments described herein may provide access to programming information based on date to facilitate a user obtaining programming information for a particular date. Embodiments described herein may provide such access or control via a header or "date ribbon" that provides a plurality of user-selectable dates. User selection of one of the plurality of dates may cause the EPG to display programming information for the selected date.

Various implementations are possible. For example, satellite, cable, analog or digital terrestrial, internet or other broadcasting technologies may be suitable. Thus, while the following description provides an example in the context of a television service provider employing a satellite broadcast system, it should be understood that such description is not limiting.

Figure 1:
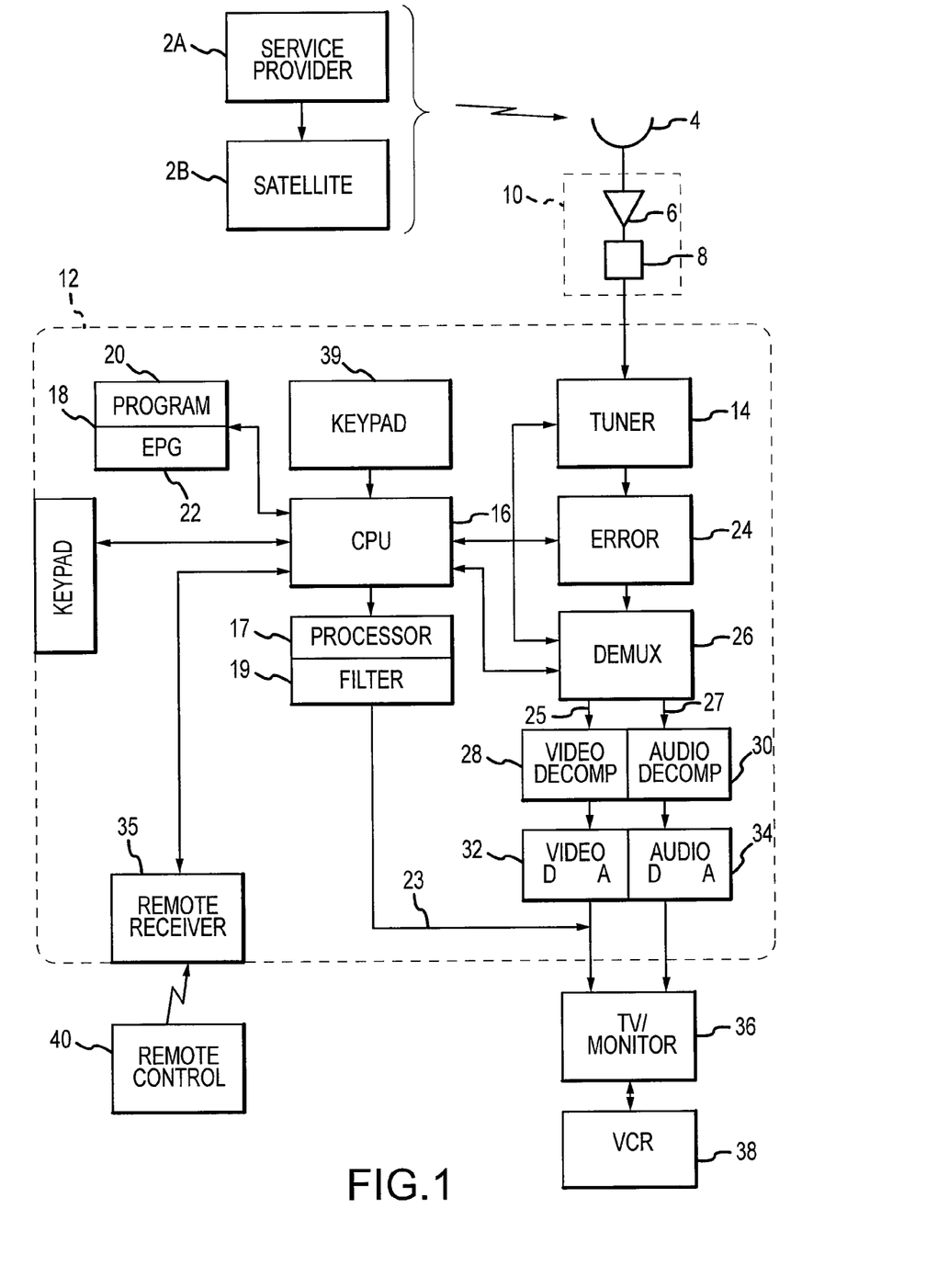
FIG. 1 is a block diagram illustrating major components of an example of a direct broadcast satellite television system.
Figure 2:
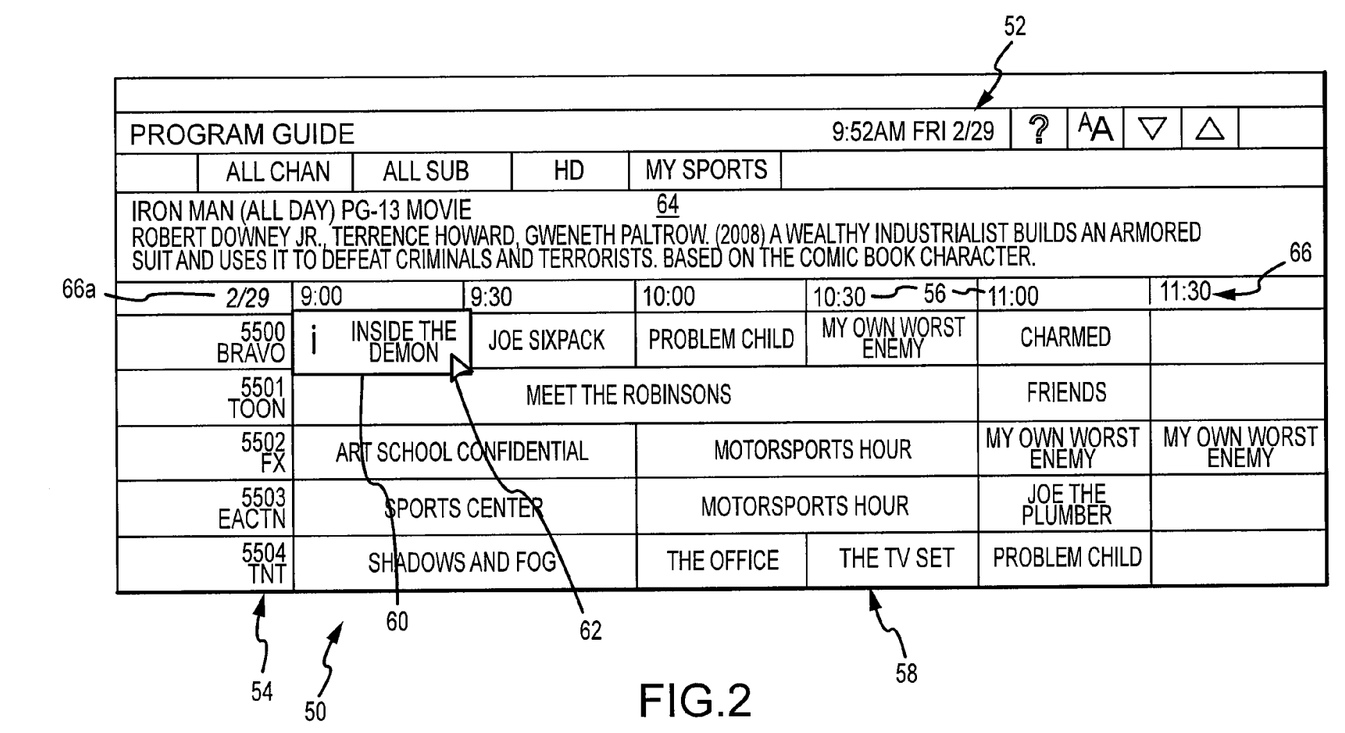
FIG. 2 illustrates an example of a display of an enhanced EPG output in response to a first user input.
Figure 3:
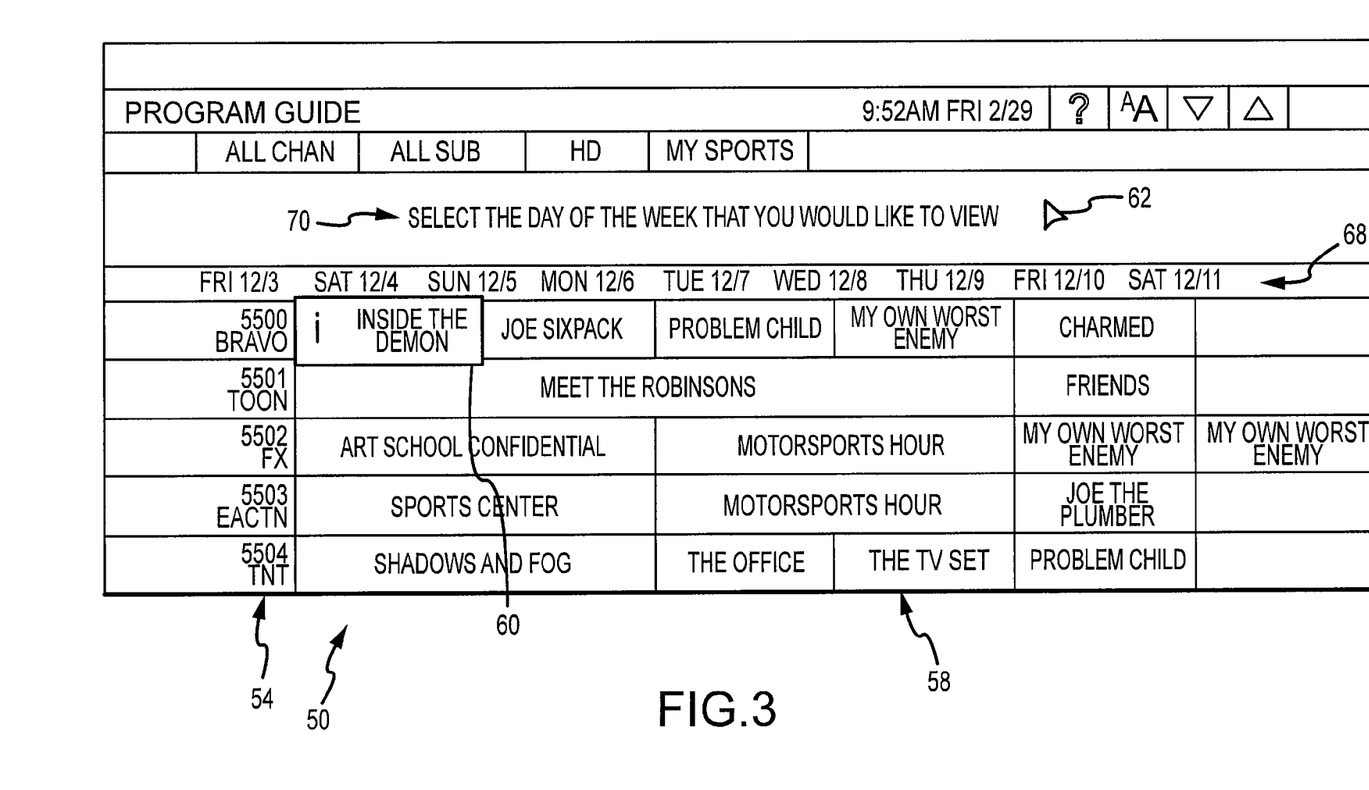
FIG. 3 illustrates an example a display of an enhanced EPG output in response to a second user input.
Figure 4:
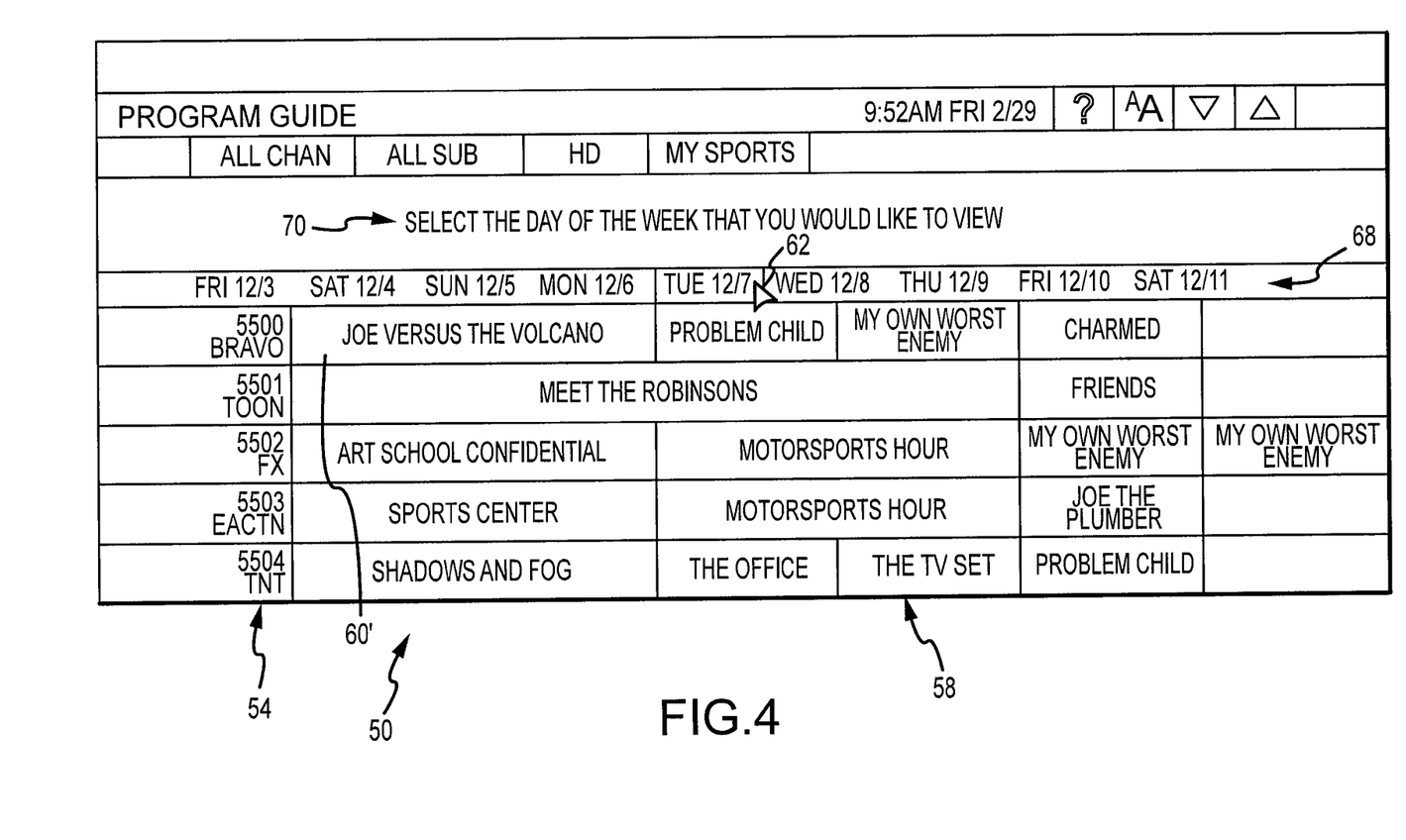
FIG. 4 illustrates an example of a display of an enhanced EPG output in response to a third user input.
Figure 5:
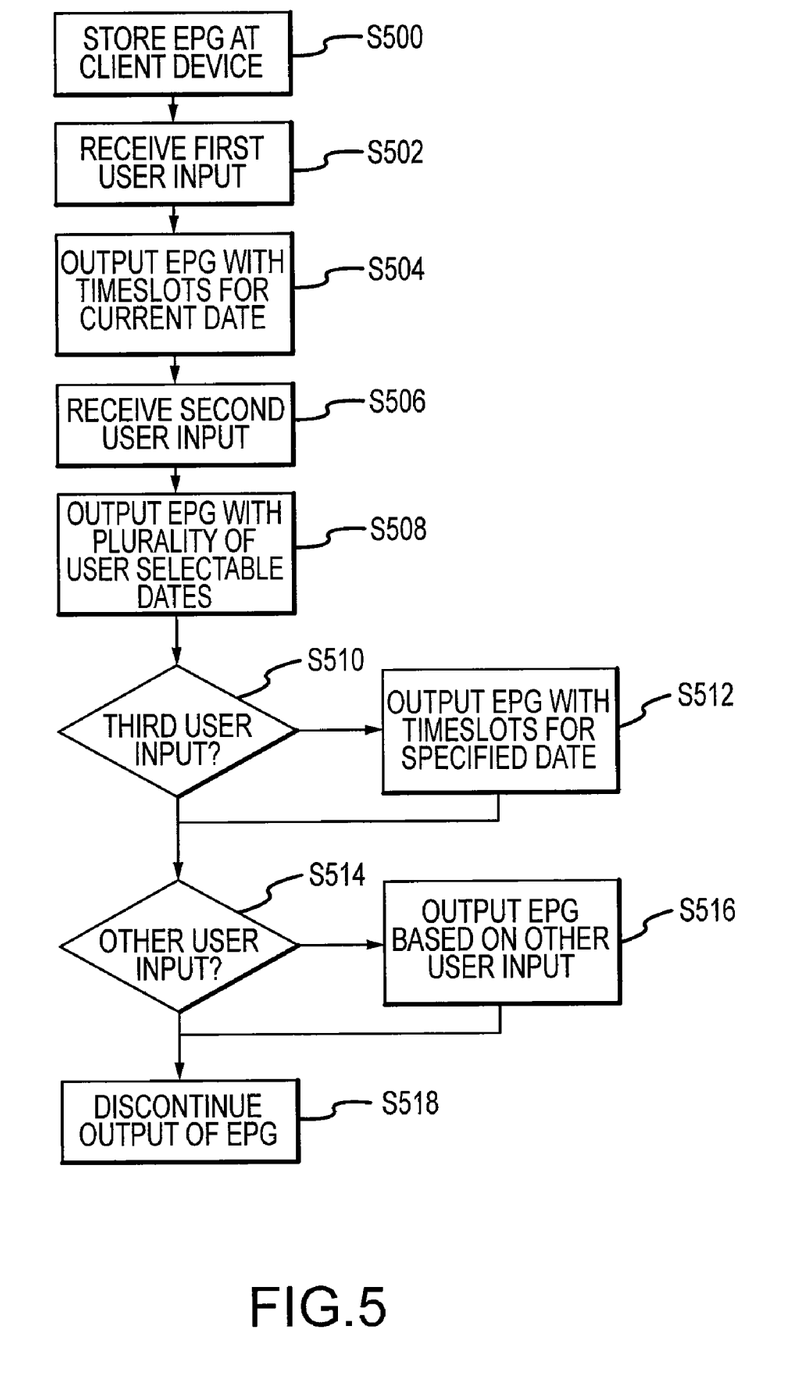
FIG. 5 is a flowchart illustrating a method of providing an enhanced EPG.

The block diagram shown in FIG. 1, the displays shown in FIGS. 2, 3 and 4 and the flowchart shown in FIG. 5 are for illustration only and are not intended to represent the only possible displays, process flows and system configurations. In particular, it should be understood that process steps may be added, omitted and reordered as may be suitable to a particular application. Also, individual components may be added, omitted, replaced and interrelated as may be suitable to a particular application. All details appurtenant to implementing the exemplary processes and systems that are well understood in the art are omitted for simplicity and clarity.

FIG. 1 is a block diagram that shows various components that may be used to implement various features of the present invention. It should be understood that this diagram and the description thereof is intended to provide a general understanding of how the principles described herein may be implemented, and is not exhaustive of implementations that may be envisioned. For example, a direct broadcast satellite system incorporating packetized transmission according to the MPEG-2 standard may be used, although any programming source that includes an EPG, or transmits data to be incorporated into an EPG, is contemplated. Encrypted direct broadcast satellite (DBS) signals may be transmitted from a source 2, such as a television service provider 2A via a satellite 2B. Such signals may be received as downlinked signals by a satellite antenna 4, such as a parabolic dish of approximately eighteen to thirty-six inches in diameter in one embodiment. Front end processing of the satellite signals may be accomplished by a low noise block converter feed (LNBF) provided in the antenna focal point. This may include a converter module 10 with a low noise amplifier 6, which receives the signals from the feed, and by a down converter 8, which converts the entire frequency band of the satellite signals to a lower frequency range that may be efficiently transmitted, for example, via coaxial cable to a client device, such as a satellite receiver 12. A tuner 14 may select a specific channel from the downlinked signal 2 and feed the selected channel to an error correction and packet synchronization module 24. The error correction and packet synchronization module 24 may output a fully compliant transport stream, which may be directed to a packet demultiplexer 26. Various encoding or formats may be used.

The packet demultiplexer 26 may be an integrated circuit that accepts the packetized, time domain multiplexed data stream of the transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 25 and the video stream 27 may be fully compliant audio and video program elementary streams, respectively. In addition to routing packets of data, the packet demultiplexer 26 may also descramble encrypted data, provide various buffering of the formatted data, and handle a program clock reference to keep a local clock synchronized with the clock at the uplink center (e.g., service provider 2A). Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

The EPG 22 may comprise a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 25 to be displayed on the television/monitor 36.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may comprise an instruction set that creates the EPG 22 and allows a user to manipulate the EPG 22, as discussed further below. While the EPG program 20 may be implemented as hardware, the EPG program 20 may alternatively or additionally comprise a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

As illustrated in FIG. 2, programming information contained in the EPG 22 may be displayed on the TV/monitor 36 in the form of a screen or graphical user interface 50. As an example, the screen or interface 50 may allow the user to examine programming information contained in the EPG 22 for programs scheduled for up to at least two days into the future, although the number of days is not so limited. The user may summon the screen or interface 50, for example, by pressing the GUIDE key on the remote control device 40 or the keypad 39.

Current date, day of the week, and time 52 may be displayed in the screen or interface 50. The screen or interface 50 may list channels 54 in a column at a left edge, and may present timeslots 56 in a row across so as to form a grid 58 defined by the channels 54 and timeslots 56. For example, timeslots 56 may be divided into 30 minute intervals, but other intervals may be used as well. Titles or descriptions corresponding to individual programs 60 may be displayed corresponding spaces in the grid 58. Upon summoning of the screen or interface 50, a cursor 62 may be placed upon the program corresponding to the programming selection currently being viewed. The cursor 62, illustrated as an arrowhead in FIG. 2, may be implemented in any desired manner, for example, by drawing a box around the program, highlighting the program, or the like. Any of the programs may be selected for viewing by moving the cursor to the desired program via arrow keys located on the remote control device 40 or the keypad 39 and pressing the SELECT key, for example. Scrolling using a touch pad on the remote control device 40 may also provide such movement. If the selected event is to be shown in the future, the user may set up an event timer. Further, as the cursor 62 is placed over a particular one of the programs 60, additional information 64 regarding the particular program may be presented.

The user may traverse the channels 54 by scrolling via vertical arrow keys, a touchpad, or the like on the remote control device 40 or the keypad 39. The timeslots 56 may be traversed either by scrolling via left and right arrow keys, a touchpad or the like, or by specifying a number of hours, forward and/or reverse as available. As the timeslots 56 are traversed, a header 66 indicating times of the timeslots 56 may change as needed to correspond to timeslots as they are displayed. A date 66a, which may or may not be part of the header 66, may be included in the EPG to identify the date of the timeslots 56 currently included in the EPG. Thus, the date 66a may also change as needed. Such movement may be implemented by buttons on the remote control device that are configured to move the cursor a preset number of hours, forward or reverse. However, in such approaches for accessing programming information, the user moves sequentially through the programming information in the EPG.

Therefore, in addition to such approaches for accessing programming information, the EPG 22 may be controllable to directly access programming information for a particular date. As illustrated in FIG. 3, such a date-based approach to accessing programming information may be envisioned as a header 68 that indicates or includes a plurality of dates. The dates may be presented in any suitable manner, such as numerical month and day, alphabetical month and numerical day, and/or days of the week, whether spelled out or abbreviated. The header 68 may be presented in addition to the header 66 indicating times of timeslots, or may replace the header 66, as shown in FIG. 3.

A second user input, received when the EPG is output for display as shown in FIG. 2, may cause the EPG to be output for display as shown in FIG. 3. For example, movement of the cursor 62 by the user over the header 66 indicating times of the timeslots may cause the header 68 indicating a plurality of dates to be displayed and/or replace the header 66. Alternatively, a user may press a button on the remote control device 40, which may or may not be in conjunction with the cursor 62 being positioned over an icon or other graphical button displayed in the screen or interface 50.

As illustrated in FIG. 3, instructional information 70 may also be output for display in the EPG in response to the second user input. The instructional information 70 may be included in the EPG in any suitable manner. For example, as shown, the instructional information 70 may replace the additional information 64 regarding a particular program. This may draw the user's attention to the instructional information 70, and may help to make the user aware of the functionality, described further below, that is enabled in conjunction with the header 68. The instructional information 70 may also provide instructions relating to how to implement the functionality, such as shown in FIG. 3.

As illustrated in FIG. 4, moving the cursor 62 over one of the plurality of dates in the header 68 may constitute a third user input that indicates or selects that date. In response, the EPG output for display may include information regarding programs 60' for the indicated/selected date. It should be understood that the third input for indicating or selecting the date may be implemented in any suitable manner. For example, moving the cursor 62 over one of the dates and pressing the "SELECT" key on the remote control device 40 may provide the third input. Alternatively, the cursor 62 may automatically be positioned over one of the plurality of dates in the header 68 so that information regarding programs 60' for that date is included in the EPG for display. In such case, the user may traverse the header 68 and select other dates to display information regarding programs for that date.

Although not shown, it should be understood that the header 66 indicating times of the timeslots may be displayed. As discussed above, in some embodiments the header 66 may be replaced with the header 68. Once a particular date is selected, the header 66 may be displayed in the EPG again, and may replace the header 68 to present an EPG similar to that shown in FIG. 2, but with the information for programs 60' in the timeslots 56. Further, the instructional information 70 may be replaced with the additional information 64 for one of the programs 60'. Also, the selected one of the dates (Tue December 7 in FIG. 4) may be displayed, for example, adjacent the header 66 to identify the timeslots 56 as being for the selected date, such as is the date 66a shown in FIG. 2.

Other implementations may be envisioned as well. For example, the plurality of dates need not be in the form of a header, but may be displayed for user selection in any suitable form. Further, the particular layout of the screen or interface 50 may vary, as appropriate or desired, while still maintaining the functionality described herein.

Another implementation may involve a plurality of predetermined time values rather than specific dates. While such an implementation is not a date-based approach, the access to programming information in the EPG may still be non-sequential. For example, a plurality of time values may be presented as a header similarly to the header 68 discussed above.

The predetermined time values may be equal or otherwise, and may include both positive values (increments) and negative values (decrements) to navigate the EPG forward and rearward in time. For example, time values of −48 hours, −24 hours, −12 hours, −6 hours, 6 hours, 12 hours, 24 hours and 48 hours may be included in the header. The time values may also be expressed in terms of days, such as time values of −4 days, −3 days, −2 days, −1 day, 1 day, 2 days, 3 days, 4 days, or any combination of minutes, hours, days and/or weeks, as appropriate or desired.

The user may indicate or select one of the time values to cause the EPG to be output for display with information regarding timeslots that are the indicated/selected time value from the timeslots being displayed when the indication/selection is made. Thus, the user may cause the EPG to skip ahead or backward according to the indicated/selected time value, without the user having to perform multiple iterations of inputs (such as of a fixed time increment or decrement) and without the EPG outputting program information for intervening timeslots in response to each iteration.

It should be understood that implementation of the EPG is not limited to that described above. Any known systems and methods for implementing an EPG as known in the art may be employed to achieve the basic operations of an EPG as described above, or other operations of an EPG as may be appropriate or desired for a given application. In other words, although embodiments are described herein with respect to the implementation of an EPG in the form of a grid as described above, it should be understood that other implementations are possible and not excluded.

It should also be understood that various implementations of methods for non-sequential and/or date-based navigation in an EPG are possible and may be envisioned based on the foregoing description. A particular example of one method is illustrated in FIG. 5. It should be understood that the method illustrated in FIG. 5 is a relatively simplistic, high level description, and that various modifications may be envisioned for particular applications, as appropriate or desired.

Control may begin at S500, with EPG information including timeslot, program information, and the like, for display may be stored at a television receiving device or client device. The EPG information may be stored on the client as illustrated in FIG. 1, or may be stored locally elsewhere, as appropriate or desired. It should be understood that S500 may be optional, as access to the EPG information need not be local.

Next, at S502, a first user input may be received by the client device. The first user input may result, for example, from the user pressing a button on a remote control device and/or user interaction with a graphical user interface displayed by the client device via a display device, such as a television. In response to the first user input, at S504 the client device may output the EPG information to be displayed with timeslots and program information for the timeslots of the current date. The particular EPG information output for display may be determined in any suitable manner, such as based on the current date, time and tuned channel as known in the art. Further, the format of the EPG information output for display may be determined based on settings at the client device, for example, as known in the art.

Next, at S506, a second user input may be received by the client device. The second user input may result, for example, from the user interacting with a graphical user interface as described above, or from the user pressing a button or other input means on the remote control device. At S508, the client device may output the EPG information to be displayed with a plurality of user selectable dates. As discussed above, this may be in the form of a header including the plurality of dates, which may replace a header including times of the timeslots when included in the output of the EPG at S504. Also as discussed above, instructional information maybe included in the output of the EPG at S508.

Once the EPG including the plurality of user selectable dates is output for display, a determination maybe made at S510 as to whether a third user input is received. If so, then the client device may output the EPG information to be displayed with the timeslots and program information of the timeslots for the date specified by the third user input at S512. As discussed above, the third user input may specify or identify the date in any suitable manner, such as by selecting one of the plurality of dates with a cursor. Further, the output of the EPG information at S512 may replace the plurality of dates with times of the timeslots and/or replace the instructional information with additional information regarding one of the programs in current timeslots to be displayed.

If no such third input is received, a determination maybe made at S514 as to whether other user input is received. Other user input may be of any kind, and may cause the client device to output the EPG based on the other output at S516. For example, the other input may be a user input that exits the date-selectable functionality provided at S508. Thus, the EPG output at S516 may be a return to the output of the EPG provided at S504. Alternatively or additionally, the other input may be a user input that causes navigation via the timeslots, specifies a channel, specifies a timeslot, or otherwise changes the EPG to be output at S516.

Thus, it should be understood that continuing control of the output of the EPG information for display may be performed in any suitable manner, as appropriate or desired. It should also be understood that the other user input determined as received at S514 is for continued output of the EPG information for control to continue to S516. Otherwise, control may proceed to S518, where the output of the EPG information may be discontinued. For example, if the other user input received is selection of a particular program to be displayed, the EPG information may no longer be displayed. Alternatively or additionally, control may proceed to S518 after elapse of a predetermined amount of time without receiving further user input.

Again, it should be understood that the processes described above with respect to FIG. 5 is only an example, and is not intended to illustrate all possible processes that may be envisioned for implementing the various features described herein. As such, although not shown for the sake of clarity and simplicity, it should be understood that the various features described above may be incorporated in the method, as appropriate or desired, or any other suitable processes may be employed.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of the present invention.

What is claimed is:

1. A method of accessing program information in an electronic program guide, the method comprising:

storing an electronic program guide on a client device, the electronic program guide divided into timeslots containing program information corresponding to television programs being broadcast currently and to television programs scheduled for future broadcast;

receiving a first user input at the client device;

outputting, in response to the first user input, the electronic program guide from the client device to be displayed with a header indicating a plurality of dates for accessing corresponding program information, the timeslots of the electronic program guide being displayed without an indication of a time for the timeslots;

receiving a second user input at the client device while the electronic program guide is being output for display with the header indicating a plurality of dates, the second user input identifying one of the plurality of dates;

accessing program information in the electronic program guide corresponding to the identified one of the plurality of dates;

in response to the second user input, outputting the electronic program guide from the client device to be displayed with the program information corresponding to the identified one of the plurality of dates and with a header indicating times of the timeslots;

in further response to the second user input, not outputting the header indicating a plurality of dates; and in further response to the second user input; outputting the electronic program guide from the client device to be displayed with the header indicating times of the timeslots in a location previously occupied by the header indicating a plurality of dates.

2. The method of claim 1, further comprising:

receiving a third user input at the client device while the electronic program guide is being output to be displayed with the header indicating times of the timeslots; and outputting, in response to the third user input, the electronic program guide from the client device to be displayed with the header indicating a plurality of dates.

3. The method of claim 1, wherein the electronic program guide to be displayed includes an area in addition to the timeslots and the header, the method further comprising:

in response to the first input, outputting the electronic program guide from the client device to be displayed with the header indicating a plurality of dates with instructional information for operating the header to access corresponding program information for the plurality of dates shown in the header, the instructional information located in the area;

in response to the second input, not outputting the instructional information in the area; and in further response to the second input, outputting the electronic program guide from the client device to be displayed with the header indicating times of the timeslots with program information corresponding to a program of one of the timeslots, the program information located in the area.

4. The method of claim 2, in response to the third input, the method further comprising:

not outputting the header indicating times of timeslots; and outputting the electronic program guide from the client device to be displayed with the header indicating a plurality of dates in a location previously occupied by the header indicating times of the timeslots.

5. A television receiving device, comprising:

a memory configured to store an electronic program guide, the electronic program guide divided into timeslots containing program information corresponding to television programs being broadcast currently and to television programs scheduled for future broadcast;

a user interface configured to receive user input; and a processor in communication with the memory and the user interface, configured to output the electronic program guide to be displayed with a header indicating a plurality of dates for accessing corresponding program information in response to a first user input received via the user interface, the timeslots of the electronic program guide being displayed without an indication of the for the timeslots, configured to access program information in the electronic program guide corresponding to one of the plurality of dates identified by a second user input received via the user interface, and, in response to the second user input, configured to not output the header indicating a plurality of dates and to output the electronic program guide to be displayed with the program information corresponding to the identified one of the plurality of dates and with a header indicating times of the timeslots in a location previously occupied by the header indicating a plurality of dates.

6. The device of claim 5, wherein the processor is configured to output the electronic program guide to be displayed with the header indicating a plurality of dates in response to a third user input received via the user interface while the electronic program guide is being output to be displayed with the header indicating times of the timeslots.

7. The device of claim 5, wherein the processor is configured to output the electronic program guide to be displayed with an area in addition to the timeslots and the header, the area including information corresponding to a program of one of the timeslots when the processor outputs the electronic program guide with the header indicating times of the timeslots, and, when the processor outputs the electronic program guide with the header indicating a plurality of dates, the area including instructional information for accessing corresponding program information via the plurality of dates.

8. The device of claim 6, wherein, in response to the third user input, the processor is configured to not output the header indicating times of the time slot, and to output the electronic program guide to be displayed with the header indicating a plurality of dates in a location previously occupied by the header indicating times of the timeslots.

9. A graphical user interface for a television receiving device, the graphical user interface comprising:

an electronic program guide output from a client device and divided into at least a two-dimensional grid of timeslots containing program information corresponding to television programs being broadcast currently and to television programs scheduled for future broadcast;

at least one user selectable icon output from a client device and indicating a plurality of dates, the at least one user selectable icon comprises a header of the at least two-dimensional grid of timeslots, the at least one user selectable icon configured to cause the television receiving device to access corresponding program information in response to user input selecting one of the plurality of dates, wherein prior to receipt of the user input, the timeslots of the electronic program guide are displayed without an indication of a time for the timeslots, and following receipt of the user input the at least one user selectable icon is no longer displayed; and a header output from client device indicating times of the timeslots that is displayed in a location previously occupied by the at least one user selectable icon.

10. The graphical user interface of claim 9, further comprising an area in addition to the at least two dimensional grid of timeslots and the header, the area including instructional information for accessing corresponding program information via the plurality of dates.

11. The graphical user interface of claim 10, further comprising a header indicating times of the timeslots that replaces the at least one user selectable icon in response to the user input selecting one of the plurality of dates;

wherein the area in addition to the at least two dimensional grid of timeslots and the header includes information corresponding to a program of one of the timeslots when the header indicating times of the timeslots replaces the at least one user selectable icon.

12. The graphical user interface of claim 11, wherein the information corresponding to a program of one of the timeslots replaces the instructional information when the header indicating times of the timeslots replaces the at least one user selectable icon.

13. A non-transitory computer-readable storage medium including instructions stored thereon that, when executed by a processor, cause the processor to provide an electronic program guide for display on a viewing screen by:

accessing an electronic program guide, the electronic program guide divided into timeslots containing program information corresponding to television programs being broadcast currently and to television programs scheduled for future broadcast;

outputting, in response to a first user input, the electronic program guide to be displayed with a header indicating a plurality of dates for accessing corresponding program information, the electronic programming guide including an area in addition to the time slots and the header;

outputting, in further response to the first user input, the electronic program guide from the client device to be displayed with the header indicating a plurality of dates with instructional information for operating the header to access corresponding program information for the plurality of dates shown in the header, the instructional information located in the area;

accessing program information in the electronic program guide corresponding to one of the plurality of dates identified by a second user input; and outputting, in response to the second user input, the electronic program guide to be displayed with the program information corresponding to the identified one of the plurality of dates and with a header indicating times of the timeslots;

in further response to the second input, not outputting the instructional information in the area; and in further response to the second input, outputting the electronic program guide from the client device to be displayed with the header indicating times of the timeslots with program information corresponding to a program of one of the timeslots, the program information located in the area.

14. The computer-readable storage medium of claim 13, further including instructions stored thereon that, when executed by a processor, cause the processor to, in response to the second input, not output the header indicating a plurality of dates and output the electronic program guide to be displayed with the header indicating times of the timeslots in a location previously occupied by the header indicating a plurality of dates.

15. The computer-readable storage medium of claim 13, further including instructions stored thereon that, when executed by a processor, cause the processor to provide an electronic program guide for display on a viewing screen by outputting, in response to a third user input, the electronic program guide to be displayed with the header indicating a plurality of dates.

16. The computer-readable storage medium of claim 15, further including instructions stored thereon that, when executed by a processor, cause the processor to not output, in response to the third user input, the header indicating a plurality of times of the timeslots and to output the electronic program guide to be displayed with the header indicating a plurality of dates in a location previously occupied by the header indicating times of the timeslots.

* * * * *